United States Patent [19]
Faure et al.

[11] Patent Number: 4,512,790
[45] Date of Patent: Apr. 23, 1985

[54] ROTARY SEALING DEVICE

[75] Inventors: Michel Faure; Jean Y. Regeffe; Yves Lumineau; André Jouanin, all of Conflans-Ste-Honorine, France

[73] Assignee: Lignes Telegraphiques & Telephoniques, Honorine, France

[21] Appl. No.: 369,275

[22] Filed: Apr. 16, 1982

[30] Foreign Application Priority Data

Apr. 21, 1981 [FR] France ............................ 81 07914

[51] Int. Cl.³ ............................................. C03B 37/07
[52] U.S. Cl. ........................................ 65/13; 118/725;
118/733; 55/400; 285/348; 285/275; 210/449
[58] Field of Search ............... 210/445, 449, 451;
118/725, 733; 427/166, 167, 168; 65/3.12, 13;
285/348, 275; 55/269, 400

[56] References Cited

U.S. PATENT DOCUMENTS

| 463,410 | 11/1891 | Weaver | 210/445 |
|---|---|---|---|
| 2,379,035 | 6/1943 | Phillips | 210/448 |
| 2,398,618 | 4/1946 | Chavayda | 285/348 |
| 3,933,454 | 1/1976 | DeLuca | 427/167 |
| 4,089,550 | 5/1978 | Denton | 285/276 |
| 4,280,829 | 7/1981 | Sheth | 118/725 |
| 4,295,870 | 10/1981 | Schneider | 65/3.12 |
| 4,347,069 | 8/1982 | Haney et al. | 65/3.12 |

FOREIGN PATENT DOCUMENTS

| 262717 | 9/1912 | Fed. Rep. of Germany . |
| 867333 | 2/1953 | Fed. Rep. of Germany . |
| 811077 | 4/1959 | United Kingdom . |
| 1555562 | 11/1979 | United Kingdom . |

Primary Examiner—Richard V. Fisher
Assistant Examiner—Wanda L. Millard
Attorney, Agent, or Firm—Roland Plottel

[57] ABSTRACT

A rotary sealing device for connecting a fixed gas supply pipe to a tube rotating about its axis. It comprises a first rotary member for receiving the fixed pipe, a second rotary member for receiving and sealing the rotary pipe and fixed to the first member, and a filter placed in a chamber made in the aforementioned members and forming an obstacle to the gas flow and consequently to an overpressure of said gas, opposing the entry into the said chamber of gas coming from outside the device.

9 Claims, 1 Drawing Figure

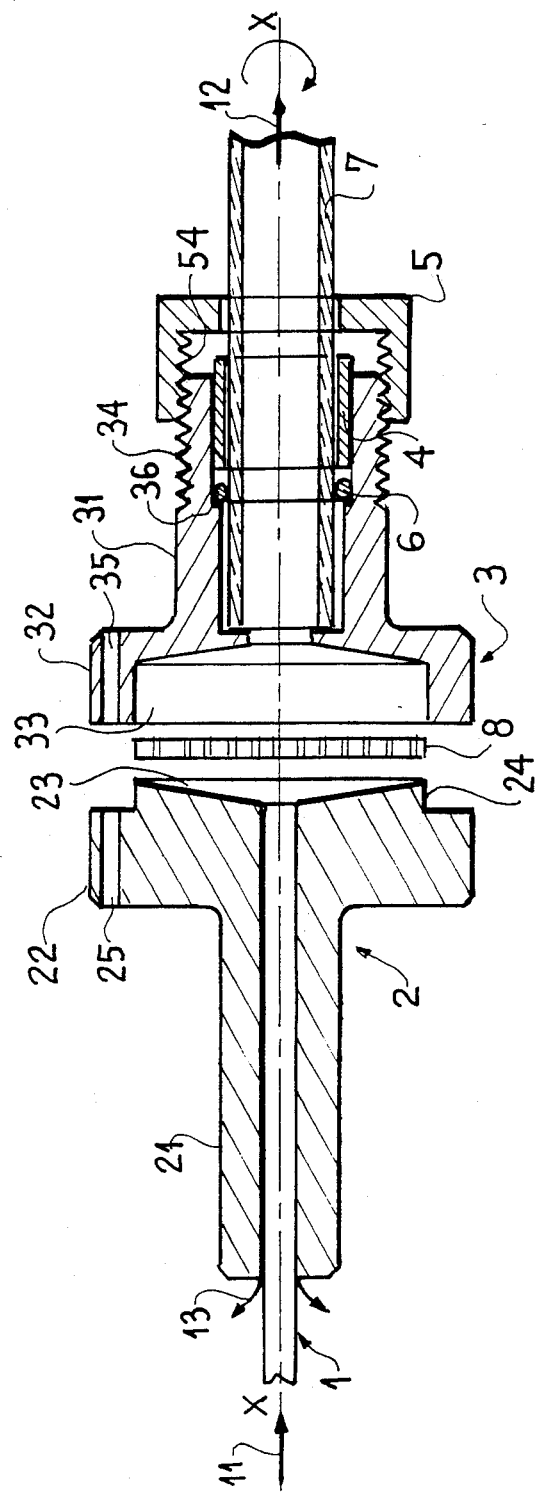

ROTARY SEALING DEVICE

BACKGROUND OF THE INVENTION

The present invention relates to a rotary sealing device for connecting a fixed fluid supply pipe to a tube rotating about its axis, particularly intended for use on an apparatus for the production of optical fibers.

The term optical fiber is generally understood to mean a light wave guide which, in its simplest form, consists of at least two layers of glass. One layer forms the core of the fiber and the other forms the cladding for the fiber and is placed round the core, whilst having a refractive index below that of the core. In certain applications, it is known to use a fiber in which the index varies radially in a continuous or discreet manner from a higher value at the center to a lower value at the periphery. Various processes are known for the production of such fibers and they generally comprise three main steps:

the production of a solid glass cylinder, called the preform, whose index varies discreetly or continuously from the center towards the periphery;

fiber formation, i.e. the drawing out of the preform in order to obtain a greater fiber length, whose diameter is well below that of the preform;

the protection of the thus obtained fibers.

A number of different processes for producing the preforms are also known and in particular a vapour phase deposition process known under the initials M.C.V.D. (Modified Chemical Vapor Deposition) consisting of using a hollow cylindrical tube, e.g. of silica, through which passes a gaseous stream of silicon chloride and oxygen, to which may be added a certain number of compounds (generally halides) of materials for doping the silica, in order to vary its index. The tube performs a rotary movement and is externally and locally heated in order to bring about an oxidation of the gases, as well as the deposition and vitrification of the products of the chemical reaction within the tube and at the heated point. The heating area is displaced all along the tube.

Such a production process leads to a sealing problem. Thus, the gas supply pipe is generally fixed, or may perform a translation movement, whereas the silica tube rotates. This sealing problem is particularly critical due to the vulnerability of the optical fibers to impurities and in particular the humidity contained in the air and which leads to variations in the chemical composition of the glass forming the preform. These variations result in selective energy absorptions as a function of the wavelength and particularly at about 1.4 $\mu$m. This is particularly disadvantageous when using an optical fiber obtained from such a preform.

It is known to use a rotary joint between the gas supply pipe and the rotary silica tube to bring about such a seal. However, this solution gives rise to problems, linked with the fact that the silica tube diameter is not constant and the rotary joint is subject to wear due to the mechanical movement and to corrosion resulting from the gases used for producing the preform.

BRIEF SUMMARY OF THE INVENTION

An object of the present invention is to provide a rotary sealing device not suffering from the aforementioned disadvantages.

The present invention therefore relates to a rotary sealing device connecting a fluid supply pipe to a tube rotating about its axis, comprising first rotary means for receiving said pipe, second rotary means for receiving and sealing said rotary tube, said second means being fixed to said first means, and third means positioned between said first and second means and fixed thereto, for forming a fluid flow obstacle, thereby said third means opposes the penetration of a fluid from outside said device towards said second means.

In this way leaks which may occur at the first means can only act from the inside of the sealing device towards the outside and not in the opposite direction.

DESCRIPTION OF THE DRAWING AND PREFERRED EMBODIMENTS

The invention is described in greater detail hereinafter relative to non-limitative embodiments and with reference to the single drawing, which is an exploded, diagrammatic, sectional view of the device according to the invention.

In the left-hand part of the drawing it can be seen a gas supply pipe 1, which is fixed or optionally performs a translation movement, the gas being supplied from left to right as shown by arrow 11. Pipe 1 is substantially cylindrical and of axis XX. On the other side of the drawing (right-hand side), it can be seen a hollow cylindrical tube 7, constituting e.g. a preform for an optical fiber and also of axis XX, which performs a rotary movement about XX and through which passes the gases supplied by pipe 1 (arrow 12). In the case of FIG. 1, the internal diameter of preform 7 is greater than the diameter of pipe 1.

The sealing device according to the invention essentially comprises a first member 2 receiving pipe 1 and forming a joint with the latter, a second member 3 receiving preform 7, which is sealingly fixed to member 3 by means 4, 5 and 6, and a pressure or charge drop device 8 located between members 2 and 3. The complete device rotates integrally with preform 7 around pipe 1.

Member 2 comprises a first cylindrical part 21 surrounding pipe 1 over an adequate length, so as to form a substantially tight joint around the latter, and a second, also cylindrical part 22 having a larger diameter in order to provide a chamber 23 for the gases 11. Part 22 of member 2 is terminated by a shoulder 24.

Member 3 also comprises two parts 31 and 32. The part 32 cooperates with part 22 of member 2. It is essentially of the same diameter as the latter and has on the inside a chamber 33 for receiving device 8 and the shoulder 24 of member 2. Parts 22 and 32 also have fixing means for joining them to one another, such as bolts passing through openings 25 and 35 made respectively in parts 22 and 32. The part 31, which is substantially cylindrical, receives preform 7. It has at its outer end a thread 34 and, substantially level with the start of thread 34, a shoulder 36 for receiving O-ring 6 on which bears an intermediate ring 4 slid into part 31. The end of part 31 is sealed by a threaded clamping ring 5, its thread 54 corresponding to thread 34 and allowing the passage of preform 7.

The pressure drop device 8 serves as an obstacle for the gas flow. It is for example constituted by a perforated plate acting as a support for a not shown lamination made from a porous material and forming a filter. In this embodiment, device 8 also makes it possible to filter gases 11, in order to remove possible impurities.

The members described hereinbefore must obviously be made from a material able to resist corrosion due to the gases 11. In the case of the manufacture of optical fibers, a fluorinated plastics material such as teflon is suitable.

In operation, member 2 is integrally mounted on member 3, enclosing device 8 in the volume constituted by chambers 23 and 33. Pipe 1 is slid into part 21 of member 2 without any other fastening. Preform 7 is slid into part 31 within rings 4 and 5. Ring 5 is screwed on to thread 34 so as to push intermediate ring 4, which then crushes the O-ring 6 ensuring the sealing of the rigid assembly formed between member 3 and preform 7.

Thus, when gases 11 traverse the device an overpressure is produced upstream of member 8 in the gas flow direction. This overpressure opposes the entry into the device of external gases, which can only occur between pipe 1 and part 21 of member 2. Any leaks will necessarily flow towards the outside from the inside of the device, as shown by arrows 13 in the drawing. In this way the inlet of preform 7 is completely insulated against any external contamination.

Obviously the invention is not limited to the embodiment described, particularly with regards to the shape of the members, which are shown with a circular cross-section, but can have any other shape. In the same way elements 21 and 22 on the one hand and 31 and 32 on the other have been described as forming parts of the same member (2 and 3 respectively), but can in fact be produced separately and assembled by any known fixing means. Finally, a use involving sealing against gases has been described, but the invention is generally applicable to any fluid.

What is claimed is:

1. A rotary sealing device connecting a stationary gas supply pipe to a rotary tube means for rotating about its axis, comprising a first rotary means for slidably receiving said pipe and having a means defining a first opening for communicating with said pipe, a second rotary means for receiving and sealing said rotary tube means, said second rotary means being fixed to said first rotary means, and a third means clamped between said first and second rotary means for creating an overpressure within the first rotary means in which penetration of vapor from outside said device into said first opening and towards said second rotary means is opposed.

2. A device according to claim 1, wherein said first rotary mmeans comprises a first part having said first opening, said pipe being slid into said first opening, thereby forming a substantially tight joint.

3. A device according to claim 1, wherein said second rotary means comprises a first part having a means defining a second opening, said rotary tube means being positioned in said second opening, and a fourth means securing said rotary tube means on to said first part.

4. A device according to claim 3, wherein said first part of said second rotary means comprises a shoulder formed in said second opening, and said fourth means comprises an O-ring positioned between said rotary tube means and said shoulder, an intermediate ring positioned between said rotary tube means and said first part bearing on said O-ring and a clamping ring rigidly fixed about the end of said first part, having a means defining an opening for passage of said rotary tube means and bearing on said intermediate ring.

5. A device according to claim 1, wherein said third means comprises a filter.

6. A device according to claim 2, wherein said second rotary means comprises a first part having a means defining a second opening, said rotary tube means being positioned in said second opening, and a fourth means securing said rotary tube means on to said first part of said second rotary means, wherein said third means comprises a filter and wherein the first parts of said first and second rotary means have each a widened part forming a chamber in which is positioned said filter.

7. A device according to claim 6, wherein at least one of said first parts is made from a fluorinated plastic material.

8. A device according to claim 2, wherein said first part is made from a fluorinated plastic material.

9. An apparatus for the production of an optical fiber comprising means for holding and rotating a tube, means for heating a cross-section of the rotary tube means and means for translating the heating means along and externally of the rotary tube means and a stationary pipe for supplying gaseous compounds to be decomposed under the action of the heating means, whereby at least part of the products obtained are deposited on the inner wall of the rotary tube means, wherein the stationary pipe and rotary tube means are connected by the rotary sealing device according to claim 1.

* * * * *